July 6, 1943.   J. L. MARTINEAU   2,323,615
ANTISEPTIC THERMOMETER HOLDER
Filed July 15, 1939   2 Sheets—Sheet 2
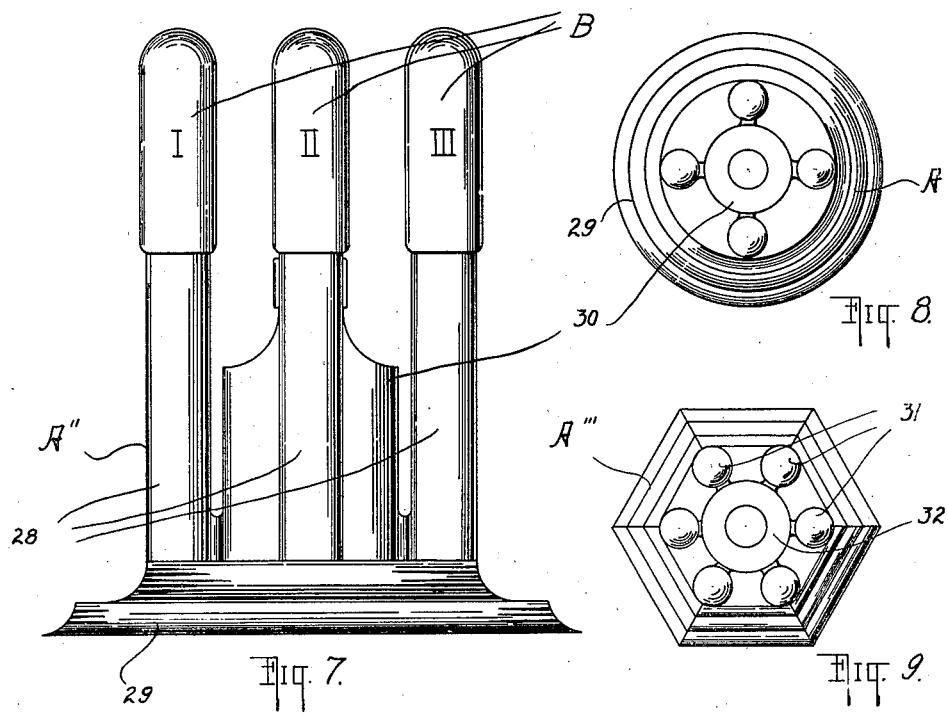
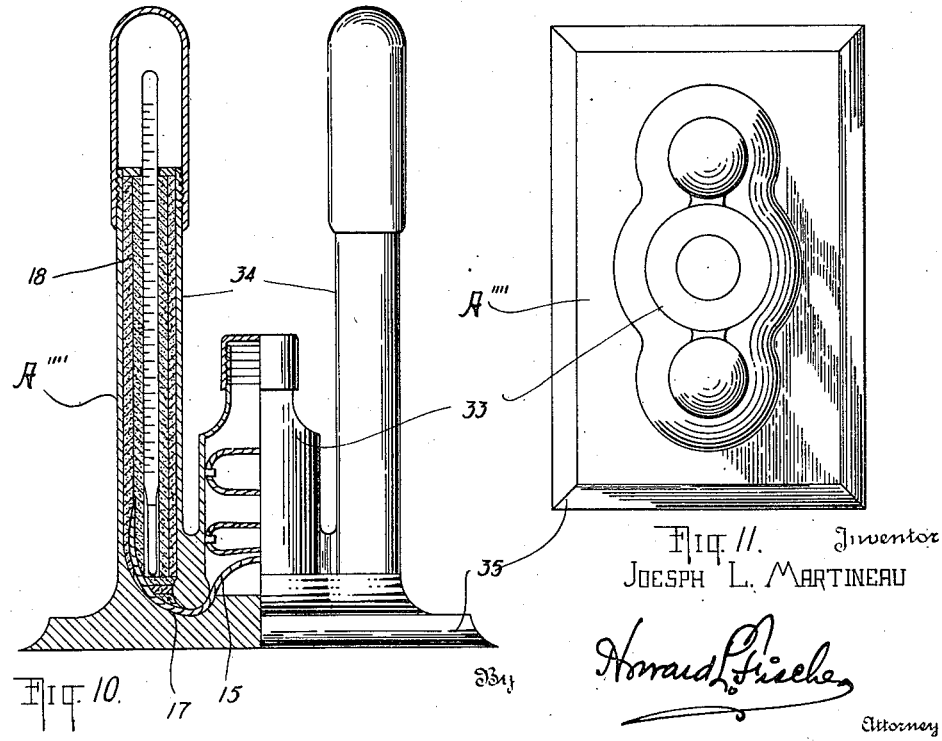
Inventor
JOESPH L. MARTINEAU Patented July 6, 1943

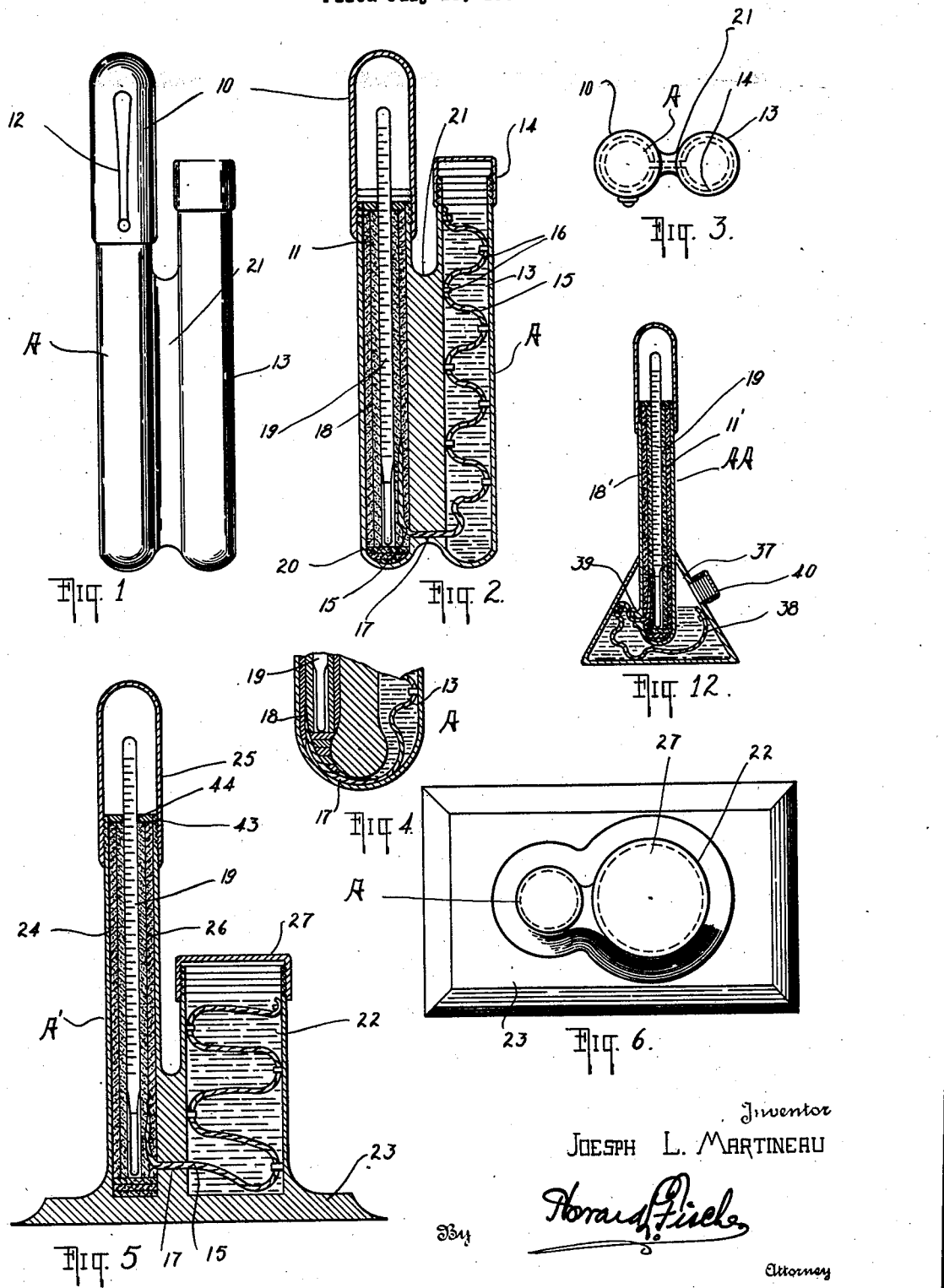

2,323,615

UNITED STATES PATENT OFFICE 2,323,615

ANTISEPTIC THERMOMETER HOLDER

Joseph L. Martineau, St. Paul, Minn.

Application July 15, 1939, Serial No. 284,739

6 Claims. (Cl. 206—16.6)

This invention relates to an instrument designed for the sterilization of clinical thermometers. The instrument may be made so that it can be carried in a person's vest pocket, or it may be made in a form to stand on a desk or table. Further, the form of this clinical thermometer instrument may be such that a number of thermometers may be sterilized at one time for hospital and clinic use.

This instrument differs from others now in use inasmuch as it can be tilted in any position with a thermometer in or out of the same, without spilling the antiseptic therein, and thus in the pocket form of the instrument, even though it is laid down when it is open and the thermometer removed, the antiseptic will not spill or run out of the same.

A feature resides in providing an instrument wherein a wick extends from the reservoir chamber which holds the antiseptic liquid or material, the wick being of sufficient size to keep the felt in the thermometer chamber moistened but not to excess. Thus there is no escape of the antiseptic fluid. The chamber in the instrument for receiving the thermometer is lined with felt or other material which is fed with antiseptic material by the wick from the reservoir chamber, thereby keeping the thermometer surrounded and in contact with the antiseptically-treated or moistened felt.

The reservoir chamber for the antiseptic may be of sufficient size to fit the needs in the thermometer chamber for a considerable time, thus relieving the doctor or person of the inconvenience of frequent filling of the instrument with the antiseptic material. It is desirable that the antiseptic solution is highly germicidal, killing some of the most virulent organisms in a very few minutes, yet is not toxic or injurious.

While it is apparent that my antiseptic thermometer instrument may be made in any form desired, it is important that the same be designed with the proper sized reservoir for the antiseptic fluid or material, and a chamber lined with absorbent material which is kept moist from the reservoir by a suitable wick so that by means of capillary attraction the chamber in which the thermometer is kept is continually moist with the antiseptic fluid. Thus when the thermometer is inserted into the same, it is contacted by this moist absorbent material which is thoroughly saturated with the antiseptic, the same contacting firmly against the body of the thermometer so as to hold the same in the antiseptic chamber. When the thermometer is withdrawn from the same, a wiping action takes place over the thermometer so that it is not only made antiseptic, but is wiped off as it is withdrawn from the chamber wherein it is normally contained.

In the pocket size and form of my thermometer instrument ordinarily a single thermometer chamber is connected to the single antiseptic reservoir, whereas, in the desk form or hospital and clinic size, the instrument may be made with one or more thermometer receiving chambers so that either two, four, six, or any number of thermometers may be connected to the single antiseptic fluid reservoir.

The advantages of my antiseptic thermometer instrument will be apparent and obviously the patient will appreciate the use of an instrument of this character either by the individual doctor or in the hospital or clinic.

My instrument provides a more sanitary as well as more convenient means of keeping an antiseptic thermometer in readiness for use at any time.

In the drawings forming a part of my specification:

Figure 1 illustrates a style of my antiseptic thermometer instrument designed for pocket use.

Figure 2 is a vertical cross section of the instrument shown in Figure 1.

Figure 3 is a plan view of the same.

Figure 4 is an enlarged section of a form of my antiseptic thermometer instrument.

Figure 5 is a vertical section of a desk model, using a reservoir chamber connected to a single thermometer receiving chamber.

Figure 6 is a plan view of Figure 5.

Figure 7 illustrates a desk form of my thermometer instrument where four thermometer receiving chambers are provided.

Figure 8 is a plan view of Figure 7.

Figure 9 is a plan view of a form of my instrument where six thermometer chambers are connected to a single reservoir.

Figure 10 is a side elevation, partly in vertical section of an antiseptic thermometer desk instrument.

Figure 11 is a plan view of Figure 10.

Figure 12 is a vertical sectional elevation of my thermometer instrument, having the reservoir for the antiseptic below and extending from the thermometer chamber.

The drawings illustrate my antiseptic thermometer instrument A in the form that would be used when carried in the doctor's pocket, or by any person carrying a thermometer in the pocket, and this form of my thermometer instrument is provided with a cap 10 for closing the thermometer chamber 11. The cap 10 is provided with a pocket clip 12 designed to hold the instrument A in the pocket.

The instrument A is provided with a reservoir 13 for the antiseptic material or liquid and which is adapted to be closed by the cap 14. The reservoir 13 may be filled with any suitable antiseptic liquid, and by means of a wick 15 which may be secured through the eyelets 16 so that the wick can be held extending virtually entirely through the compartment of the chamber 13, the antiseptic liquid is fed through the restricted passageway 17 which leads into the thermometer chamber compartment 11. One end of the wick 15 extends sufficiently into the thermometer chamber 11 and is embedded or placed in contact with the felt or fluid absorbent material 18 which lines the chamber 11, thus feeding the antiseptic liquid to the material 18 so as to cause the same to become virtually saturated with the antiseptic material from the chamber 13. The absorbent material 18 fits closely against the body or surface of the thermometer 19 so as to firmly engage and wipe the surface of the thermometer 19 as the same is inserted and withdrawn from the chamber 11.

The lower end of the chamber 11 is provided with a suitable cushioning felt or absorbent material 20 to protect the lower end of the thermometer 19. The restricted passageway 17 for the wick 15 is such that even though the chamber 13 is filled with antiseptic liquid it will not run into the chamber 11 but will be carried by capillary attraction through the wick 15 and to the absorbent felt or material 18 in the chamber 11.

In Figure 4 I have illustrated a detail of the lower end of the instrument A in a form where the restricted passageway 17 extends virtually out of the bottom of the chamber 13 rather than horizontally across as in Figure 2. The antiseptic chamber 13 may be formed connected to the thermometer chamber 11 by means of the web-like portion 21 which may be formed integral with the portions of the casing forming the chambers 11 and 13.

It is apparent that the instrument A may be made of plastic material, of any suitable nature, or of hard rubber, or formed of other desirable material so as to provide for the chambers 11 and 13 formed adjacent each other in a sufficiently compact state in the pocket form as illustrated in Figures 1 to 4, inclusive, so that the instrument A may be conveniently carried in the pocket and provide an antiseptic thermometer ready for use at any time.

Figure 5 illustrates a desk form of my antiseptic thermometer instrument A', wherein the reservoir 22 is formed extending up from the base 23 and the thermometer chamber 24 is also projected in an upright position adjacent the reservoir 22. A suitable cap 25 covers the thermometer chamber 24 and the thermometer 19 is supported in the same, held in contact with the antiseptic absorbent material 26 within the chamber 24 in a similar manner as hereinbefore set forth.

Figure 6 illustrates a plan view of Figure 5, showing a form of desk model where a single thermometer is supported from the base 23 associated with the reservoir 22. The reservoir 22 is closed by the removable cover or cap 27.

In Figure 7, I have illustrated a desk form of my thermometer instrument A", wherein four thermometer tubes or chambers 28 project upwardly from the base 29 and which are kept antiseptic by the antiseptic chamber 30 placed centrally in relation to the thermometer receiving compartments 28. This form of my thermometer may be used for hospitals or clinics where it is desirable to have several thermometers in readiness for use.

My antiseptic thermometer instrument may be made in the form A''', as illustrated in Figure 9, where six thermometer receiving tubes 31 are clustered about the antiseptic member 32 and thus a number of thermometers may be carried in a compact desk clinical or hospital instrument which provides a means of supporting the thermometers in readiness for use. It is apparent that the different thermometer receiving tubes may be numbered or initialled with indicia B, such as "I", "II", "III", etc., as shown in Figure 7, or with letters or other forms of identification for different patients where it is desirable to have the thermometers distinguished in this manner. It is also apparent that the different thermometer receiving tubes may be of different colors for distinguishing one from the other.

In Figures 10 and 11, I have illustrated my thermometer instrument A'''', wherein a single reservoir 33 is mounted between a pair of thermometer receiving tubes 34 supported by the base portion 35. This form of my thermometer provides a very desirable hospital thermometer instrument, where two patients are in a single room. This instrument may be formed with distinguishing indicia B, or may be of different colors so that one thermometer may be readily distinguished from the other, and so that a patient may know that he has a particular thermometer which is kept antiseptic and which is used only for him while he is in the hospital. While this is incidental, the keeping of the thermometer in an antiseptic container and where the thermometer is virtually automatically made antiseptic each time it is placed in the container, is of outstanding importance in my thermometer supporting instrument.

The wick 15 is virtually identical in each form and the restricted passageway 17 must be provided between the antiseptic chamber and the thermometer receiving chamber. It is apparent, however, that the wick 15 may not necessarily have to extend through the entire antiseptic chamber but may be extended into the same sufficiently far so as to be saturated by the antiseptic liquid in the antiseptic chamber and in a manner so that the wick will carry the antiseptic fluid to saturate the absorbent material 18 in the thermometer chamber. The wick may also engage in any suitable manner with the antiseptic material 18 so that the same will be thoroughly moistened by the antiseptic fluid.

Figure 12 illustrates my thermometer instrument AA with the thermometer chamber 11' in which the absorbent material 18' is placed so as to receive the thermometer 19 in the center of the same in the same manner as in Figure 2. The thermometer AA is provided with an extension reservoir portion 37 which may be formed integral with the casing forming the chamber 11' and formed as an extension thereof, or which may be formed in a base-like portion as illustrated in Figure 12, which is hollow and adapted to receive the antiseptic liquid material. The wick 38 is immersed in the reservoir 37 and this wick leads into the absorbent material 18' through the restricted opening 39 so that just the right amount of liquid antiseptic will be fed to the absorbent material 18'. In this instrument AA the reservoir for the antiseptic is at the bottom of the instrument. The reservoir 37 can be filled with antiseptic liquid by removing the closure cap 40.

The absorbent material in the casing of the thermometer instrument A is adapted to be held therein by a washer member 43. The member 43 has a central opening 44 to receive the thermometer 19 and when the thermometer is in place in the instrument even before the cap 10 or 25 is placed over the same, the chamber wherein the absorbent material is contained around the thermometer is virtually sealed, so that a minimum of evaporation will take place from the absorbent material.

I claim:

1. A thermometer supporting instrument including an elongated tubular compartment into which the thermometer is adapted to be contained, an absorbent lining for said compartment, a cap for closing said compartment, an elongated tubular antiseptic chamber substantially parallel to and adjacent said thermometer compartment, a cap for closing said antiseptic chamber, a small passageway interconnecting said thermometer compartment and said antiseptic chamber, wick means in said antiseptic chamber, said wick means extending through and substantially filling said small passageway, a portion of one end of said wick means being embedded in said absorbent lining, said wick means feeding antiseptic material into said absorbent lining from said antiseptic chamber, whereby a thermometer may be carried in said thermometer chamber so that the same is kept in an antiseptic condition, a pad in the bottom of said thermometer compartment, said pad adapted to cushion the end of said thermometer, a washer adjacent the top end of said thermometer compartment, and said washer providing means of holding said absorbent lining in place.

2. A thermometer supporting instrument, comprising a reservoir for antiseptic material, a closure for said reservoir, a wick extending from said antiseptic reservoir, a thermometer chamber adjacent and parallel to said reservoir, a restricted passage from said reservoir to said chamber through which said wick extends, an absorbent material adapted to provide a lining in said thermometer chamber, one end of said wick embedded in said lining, said wick adapted to keep said absorbent material in the thermometer chamber virtually saturated with antiseptic material and thereby provide an antiseptic compartment for the thermometer.

3. An instrument for supporting a series of clinical thermometers, a series of elongated substantially parallel thermometer chambers, caps for closing said chambers, an absorbent material for lining said thermometer chambers, a common reservoir connected by small passageways with said thermometer chambers, wick means in said reservoir, said wick means extending through and substantially filling said passageways, the ends of said wick means being substantially embedded in said absorbent linings, and said wick means adapted to direct antiseptic material to the absorbent lining of said thermometer chambers to keep the thermometers moist with antiseptic while contained in said instrument.

4. An antiseptic clinical thermometer instrument including an elongated reservoir for liquid antiseptic, a thermometer chamber adjacent and parallel to said reservoir, an absorbent lining in said chamber, a restricted passage connecting said reservoir and said chamber, wick means substantially filling and extending through said passageway, one end of said wick means being embedded in said absorbent lining, said wick means adapted to feed the antiseptic liquid from the antiseptic reservoir to said absorbent lining, a cover for the antiseptic reservoir, a cover for the thermometer chamber, and a washer-like member adjacent the top edge of said thermometer chamber adapted to retain said absorbent lining in place in said thermometer chamber.

5. A clinical thermometer instrument, including an elongated clinical thermometer, an elongated reservoir for liquid antiseptic, a closure for said reservoir, a chamber for receiving said thermometer in parallel spaced relation to said reservoir, passage means interconnecting the reservoir and the chamber and wick means filling said passage for feeding the antiseptic from said reservoir into and around the thermometer receiving chamber in a manner to keep said thermometer supported therein, moist with the antiseptic and without spilling of the antiseptic out of said instrument when the thermometer chamber is opened and the instrument is inverted.

6. An antiseptic thermometer instrument, including a chamber for receiving the thermometer, and absorbent lining for said chamber, a chamber for receiving antiseptic fluid adjacent to said thermometer chamber, a wick passageway extending from said antiseptic chamber to said thermometer chamber, a wick substantially filling said passageway and one end thereof embedded in said absorbent lining, and said wick adapted to feed antiseptic to said absorbent lining.

JOSEPH L. MARTINEAU.